United States Patent Office 3,437,034
Patented Apr. 8, 1969

3,437,034
METHOD FOR PRODUCING A PLANOGRAPHIC PRINTING PLATE
Edward C. Otto, Waldwick, N.J., and Irving Flechner, Stamford, Conn., assignors to Sperry Rand Corporation, New York, N.Y., a corporation of Delaware
No Drawing. Filed Aug. 31, 1966, Ser. No. 576,203
Int. Cl. B41n 3/00
U.S. Cl. 101—463
4 Claims

ABSTRACT OF THE DISCLOSURE

Planographic printing plates having improved properties are prepared by applying to a suitable substrate a coating comprising an aqueous composition consisting essentially of a water-swellable polyvinyl alcohol, finely divided, inert, inorganic filler, such as clay and/or titanium dioxide, and a volatile, water-soluble, monobasic acid, such as hydrochloric acid, followed by heating the resulting applied coating to volatilize the acid and the water from the applied coating. Desirably, the heating of the applied coating to dry the same is carried out at a temperature below 175° C., such as a temperature in the range 90–120° C.

---

This invention relates to planographic printing plates. More particularly, this invention relates to planographic printing plates, such as a planographic plate useful for Ektalith and other direct imaging applications, compositions useful for the production of planographic printing plates and methods of preparing the same.

It is an object of this invention to provide an improved coating or hydrophilic top coat for planographic plates.

It is another object of this invention to improve or enhance the rated life of planographic printing plates and to reduce the tone tendency of planographic plates.

It is another object of this invention to provide a planographic printing plate particularly useful for Ektalith application and to provide a printing plate, the top coat of which is rendered ink receptive when image hardener (intensifier) is applied.

It is another object of this invention to provide a smooth planographic plate having improved aging properties.

It is another object of this invention to provide a planographic plate provided with a hydrophilic polyvinyl alcohol (PVA) coating wherein there is no water soluble insolubilizing agent and residual catalyst which could weaken or reduce the useful life of the coating and/or react with the PVA to render it more ink receptive.

How these and other objects of this invention are achieved will become more apparent in the light of the accompanying disclosure.

An improved planographic plate is obtained in accordance with this invention by providing thereon as a top coat a coating comprising polyvinyl alcohol in the absence of a water-soluble insolubilizing agent and residual catalyst therefor. Accordingly, a planographic plate coated with water swellable or hydrolyzed polyvinyl alcohol in accordance with this invention does not contain a residual catalyst for the polyvinyl alcohol which can weaken or reduce the life of the polyvinyl alcohol coating and/or react further with the polyvinyl alcohol to render it ink receptive.

A planographic plate in accordance with this invention comprises a base, such as a water resistant or water repellent paper base or other conventional substrate material, provided with a coating of water swellable or hydrolyzed polyvinyl alcohol together with a finely divided inorganic filler.

A planographic plate in accordance with one embodiment of this invention is prepared by forming an aqueous admixture comprising water swellable or hydrolyzable polyvinyl alcohol, a finely divided clay, finely divided titanium dioxide and a volatile water soluble monobasic acid, such as hydrochloric acid. Desirably, there may also be included or incorporated in the admixture a very minor amount of dry, powdered melamine-formaldehyde resin for improving the wet strength of the paper base material and the adhesion of the polyvinyl alcohol coating thereon. Also, there may be advantageously included in the admixture a very minor amount of a surface active agent to improve the dispersion of the various components present in the aqueous admixture and to eliminate foaming.

The composition in accordance with this invention is applied by conventional techniques to the base or suitable substrate and the applied coating dried. Desirably, the applied coating is dried at a temperature substantially below 175° C., preferably at a temperature in the range 90–110° C., more or less. After drying the resulting coated substrate is ready for use in a planographic printing operation.

The polyvinyl alcohol incorporated in the planographic plate and coating compositions in accordance with this invention is hydrolyzed or water swellable polyvinyl alcohol, such as is readily available commercially.

The finely divided inert inorganic filler included in the coating compositions in accordance with this invention include the conventional inorganic fillers, such as clay, titanium dioxide and zinc oxide and the like and mixtures thereof.

In the preparation of a planographic plate in accordance with this invention it is especially preferred to employ hydrochloric acid, in aqueous concentrated form, as the monobasic inorganic acid. Hydrochloric acid is readily water soluble and is volatile at atmospheric pressure at a relatively low temperature, such as a temperature in the range 90–120° C., with the result that during drying substantially all of the hydrochloric acid is removed leaving behind no residual hydrochloric acid which might serve as a catalyst to impair the printing qualities of the finished planographic plate.

Desirably, particularly when the substrate is a paper composition, the aqueous coating admixture might also include a very minor amount of melamine-formaldehyde resin to further improve or impart water resistant properties to the base or substrate material and/or to improve the adhesion of the coating thereto. Further, if desired, there may be incorporated in the coating admixture a very minor amount of a surface active material to improve the dispersion of the various components making up the coating admixture and/or reduce or eliminate foaming, e.g. air bubbles, in the coating admixture.

Coating admixtures in accordance with this invention may have the following composition:

| Component: | Percent by weight |
|---|---|
| Polyvinyl alcohol (10% solution) | 45–60 |
| Clay | 15–25 |
| Titanium dioxide | 3–15 |
| Surface active agent, e.g. Surfynol PC | 0–0.05 |
| Hydrocloric acid (20° Baumé) | 0.1–1.0 |
| Parez 607 (melamine-formaldehyde resin) | 0.1–0.7 |

There would also be included in the coating admixture sufficient water as needed for laying down a coating of the desired characteristics.

The following examples are illustrative of the practices of this invention.

EXAMPLE NO. 1

Planographic printing plates useful for Ektalith processing and other direct imaging applications were prepared as follows. Paper prepared from 100% bleached chemical wood and containing 1% by weight melamine resin and 1.25% by weight rosin size for wet strength and having a weight of 79 pounds/ream (24" x 36" x 500) was coated with a polyvinyl alcohol-containing coating composition in accordance with this invention. The polyvinyl alcohol-containing coating composition was prepared by adding about 39 pounds Osmose clay, about 15 pounds titanium dioxide and 23 cc. Surfynol PC with agitation to about 112 pounds of polyvinyl alcohol stock solution and about 16 pounds of water. The polyvinyl alcohol stock solution was made up of 6 parts by weight Elvanol 71-30, 1 part by weight Elvanol 70-05 and 70 parts by weight water.

About ½ pound Parez 607 melamine-formaldehyde resin was added to about 16 pounds of water and about 1.3 pounds of 20° Baumé hydrochloric acid. When completely disoslved the resulting solution was added with agitation to the already prepared admixture of polyvinyl alcohol, clay, titanium dioxide and Surfynol PC. The viscosity of the resulting total admixture was checked with a Stormer viscosimeter at 157 grams load at 32° C. The viscosity was adjusted with water to 53-56 seconds. It was observed that the viscosity of the coating admixture dropped to about 45-48 seconds after approximately 17 hours. The pH of the resulting final admixture was usually in the range 3.1-3.7.

The resulting coating admixture had the following composition:

| Component: | Parts by weight |
|---|---|
| PVA stock soluiton | 55.9 |
| H₂O | 16.2 |
| Clay | 19.5 |
| Titanium dioxide | 7.5 |
| Surfynol PC | .025 |
| 20° Baumé HCl | .7 |
| Parez 607 resin | .2 |

Prior to application of the coating admixture to the paper the coating admixture was filtered through a double thickness of cheesecloth so as to remove all foreign material and undispersed pigment. In the coating operation an Egan Tandum Top Coat Line Coater was employed at a coating speed of 100 feet per minute and at oven temperatures of 120° C.

The resulting coated paper exhibited a Mullen burst strength of 46-50 p.s.i., a smoothness Gurley densometer rating of 350-550 seconds and a top coat weight of 12 pounds/ream (25" x 38" x 500). The coated paper exhibited no curl after 10 days in roll age testing and the appearance of the coated paper was smooth, uniform, wrinkle-free, pinhole free, crater free and showed no rod marks.

EXAMPLE NO. 2

A coating admixture having the following composition was prepared by admixing the components identified hereinbelow:

| Component | Weight | | |
|---|---|---|---|
| | Parts by weight | Pounds | Ounces |
| (a) PVA solution | 56.11 | 112 | 3.52 |
| (b) Water | 16.22 | 32 | 7.04 |
| (c) Clay | 19.58 | 39 | 2.56 |
| (d) Titanium dioxide | 7.48 | 14 | 15.36 |
| (e) Hydrochloric acid conc | 0.37 | | 11.84 |
| (f) Parez 607 (dry, powdered melamine, formaldehyde resin) | 0.224 | | 7.17 |
| (g) Surfynol PC (non-foaming surface active agent) | 0.025 | | (¹) |

¹ 23 cc.

The thus-formed coating composition was applied to suitable paper base or substrate and the applied coating dried at a temperature in the range 90-110° C. The resulting planographic plate was smooth and exhibited improved aging properties. The planographic plate was free of any residual acid since during the drying operation the hydrochloric acid in the applied coating was volatilized. Further, the resulting planographic plate exhibited an improved useful life and reduced tone tendency.

EXAMPLE NO. 3

A coating admixture having the following composition was prepared by admixing the components identified hereinbelow in the percentages by weight indicated.

| Component: | Parts by weight |
|---|---|
| PVA solution | 56.11 |
| Water | 16.22 |
| Clay | 19.58 |
| Titanium dioxide | 7.48 |
| Hydrochloric acid conc. | 0.37 |
| Parez 607 (dry, powdered melamine-formaldehyde resin) | 0.224 |

As will be apparent to those skilled in the art in the light of the foregoing disclosure many modifications, substitutions and alterations are possible in the practice of this invention without departing from the spirit or scope thereof.

The embodiments of the invention in which an exclusive property or privilege is claimed are defined as follows:

1. A method of preparing a planographic plate comprising applying to a base a coating consisting essentially of an aqueous admixture consisting essentially of a water-swellable polyvinyl alcohol, finely divided, inert inorganic filler, powdered melamine-formaldehyde resin and hydrochloric acid, the resulting aqueous admixture having a pH in the range 3.1-3.7, and heating the resulting applied coating to a temperature below 175° C. to dry the applied coating by volatilizing the hydrochloric acid and the water therefrom.

2. A method in accordance with claim 1 wherein said heating is carried out at a temperature in the range about 90-120° C.

3. A method in accordance with claim 1 wherein said polyvinyl alcohol is present in said aqueous admixture in an amount in the range 45-60% by weight based on a 10% polyvinyl alcohol solution, wherein said finely divided, inert inorganic filler consists of clay and titanium dioxide present in said admixture in an amount in the range 15-25% by weight and 3-15% by weight, respectively, wherein said powdered melamine-formaldehyde resin is present in said admixture in an amount in the range 0.1-0.7% by weight and wherein said hydrochloric acid is present in said admixture in an amount in the range 0.1-1.0% by weight 20° Baumé hydrochloric acid.

4. A method in accordance with claim 1 wherein said aqueous admixture has the composition

| Component: | Parts by weight |
|---|---|
| 10% polyvinyl alcohol solution | 56 |
| Water | 16 |
| Clay | 20 |
| Titanium dioxide | 17.5 |
| Concentrated hydrochloric acid | 0.4 |
| Dry, powdered melamine-formaldehyde-resin | 0.2 | said composition also including a non-foaming surface active agent in an amount 0.025 part by weight.

References Cited

UNITED STATES PATENTS 2,532,865  12/1950  Toland et al. _____ 101—462
2,778,301  1/1957  Brinnick et al. _____ 101—462

DAVID KLEIN, Primary Examiner.

U.S. Cl. X.R.

101—462; 117—155, 161

U.S. DEPARTMENT OF COMMERCE

PATENT OFFICE

Washington, D.C. 20231

UNITED STATES PATENT OFFICE
CERTIFICATE OF CORRECTION

Patent No. 3,437,034                                                                        April 8, 1

Edward C. Otto et al.

It is certified that error appears in the above identified patent and that said Letters Patent are hereby corrected as shown below:

Column 4, after line 70, insert:

| | | |
|---|---|---|
| 2,691,604 | 10/1954 | Priest |
| 3,020,839 | 2/1962 | Richard |
| 3,282,729 | 11/1966 | Richardson et al. |

Signed and sealed this 14th day of April 1970.

(SEAL)
Attest:

Edward M. Fletcher, Jr.

Attesting Officer

WILLIAM E. SCHUYLER, J

Commissioner of Patent